(12) United States Patent
Nakai (10) Patent No.: US 11,400,875 B2
(45) Date of Patent: Aug. 2, 2022

(54) HOLDER AND WIRE HARNESS

(71) Applicant: SUMITOMO WIRING SYSTEMS, LTD., Yokkaichi (JP)

(72) Inventor: Hirokazu Nakai, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/270,648

(22) PCT Filed: Aug. 15, 2019

(86) PCT No.: PCT/JP2019/032011
§ 371 (c)(1),
(2) Date: Feb. 23, 2021

(87) PCT Pub. No.: WO2020/040028
PCT Pub. Date: Feb. 27, 2020

(65) Prior Publication Data
US 2021/0178994 A1    Jun. 17, 2021

(30) Foreign Application Priority Data
Aug. 24, 2018    (JP) .............................. JP2018-157057

(51) Int. Cl.
*B60R 16/02*      (2006.01)
*H01B 7/00*      (2006.01)
(Continued)

(52) U.S. Cl.
CPC ....... *B60R 16/0215* (2013.01); *H01B 7/0045* (2013.01); *H02G 3/0406* (2013.01); *H02G 15/02* (2013.01)

(58) Field of Classification Search
CPC ............ B60R 16/0207; B60R 16/0215; H02G 3/0481; H02G 15/02; H01B 7/0045
See application file for complete search history.

(56) References Cited

U.S. PATENT DOCUMENTS

| 8,790,137 B2 * | 7/2014 | Deno .................... H01R 13/648 439/607.41 |
| 9,346,420 B2 * | 5/2016 | Adachi ............... B60R 16/0207 |

(Continued)

FOREIGN PATENT DOCUMENTS

| JP | H11-230411 A | 8/1999 |
| JP | 2014-180072 A | 9/2014 |

(Continued)

OTHER PUBLICATIONS

Nov. 12, 2019 Search Report issued in International Patent Application No. PCT/JP2019/032011.

Primary Examiner — Paresh Paghadal
(74) Attorney, Agent, or Firm — Oliff PLC (57) ABSTRACT

A holder configured to be fitted to a tube that is made of metal and through which a wire is to be inserted, the holder including: a tubular main body that includes a first end and a second end opposite to the first end, and is configured to be inserted into the tube; and a cover formed protruding radially outward from an outer circumferential surface of the main body at the first end, wherein: the cover is formed only in a portion of the main body in a circumferential direction, and the cover includes a wall that protrudes radially outward from the outer circumferential surface of the main body, and a guard that extends from a radially outward end of the wall toward the second end of the main body.

10 Claims, 5 Drawing Sheets

(51) Int. Cl.
*H02G 3/04* (2006.01)
*H02G 15/02* (2006.01)

(56) References Cited

U.S. PATENT DOCUMENTS

| | | |
|---|---|---|
| 9,520,214 B2 | 12/2016 | Nakai et al. |
| 10,128,027 B2 | 11/2018 | Nakai et al. |
| 2013/0330963 A1* | 12/2013 | Miura .................. H01R 12/778 |
| | | 439/492 |
| 2014/0235092 A1* | 8/2014 | Akuta .................. H01R 13/506 |
| | | 439/353 |
| 2015/0041175 A1* | 2/2015 | Nakai ....................... F16L 7/00 |
| | | 174/83 |
| 2016/0336097 A1 | 11/2016 | Sakagami et al. |
| 2018/0241185 A1* | 8/2018 | Ueno .................... H02G 3/0481 |
| 2020/0412055 A1* | 12/2020 | Kurita .................. H01R 13/641 |

FOREIGN PATENT DOCUMENTS

| | | | |
|---|---|---|---|
| JP | 2018-063819 A | 4/2018 | |
| WO | WO-2016129382 A1 * | 8/2016 | ........... H02G 3/0481 |

* cited by examiner

HOLDER AND WIRE HARNESS

BACKGROUND

The present disclosure relates to a holder and a wire harness.

Conventionally, wire harnesses that are used in vehicles such as hybrid cars and electric automobiles include wires that electrically connect a high-voltage battery and an electrical device such as an inverter. In such a wire harness, in order to protect wires and act as a measure against noise, a plurality of wires are collectively covered by a metal pipe. A known example of this type of wire harness is a wire harness in which a resin holder is attached to an end portion of a pipe (see, for example, JP 2015-35915A). The resin holder fitted inside the pipe keeps wires inserted into the pipe from coming into contact with an end edge of the pipe, and suppresses damage to the insulating coatings of the wires.

SUMMARY

Meanwhile, due to a sharp end face of the pipe facing radially outward and exposed to the outside, there is a risk that when, for example, an operator attaches the wire harness to the vehicle, a hand of the operator may come into contact with the sharp end face of the pipe, resulting in the problem of poor attachment workability.

An exemplary aspect of the disclosure provides a holder and a wire harness that can improve the attachment workability.

The holder according to an exemplary aspect relates to a holder configured to be fitted to a tube that is made of metal and through which a wire is to be inserted, the holder including: a tubular main body that includes a first end and a second end opposite to the first end, and is configured to be inserted into the tube;

and a cover formed protruding radially outward from an outer circumferential surface of the main body at the first end, wherein the cover is formed only in a portion of the main body in a circumferential direction, and the cover includes a wall that protrudes radially outward from the outer circumferential surface of the main body, and a guard that extends from a radially outward end of the wall toward the second end of the main body.

With the holder and the wire harness of the present disclosure, it is possible to achieve the effect of improving the attachment workability.

DETAILED DESCRIPTION OF EMBODIMENTS

An embodiment will be described below with reference to the accompanying drawings. Note that there may be cases where, in the accompanying drawings, some portions of the configuration are exaggerated or simplified for convenience of description. The proportions of some portions may also differ from their actual proportions.

Figure 1:
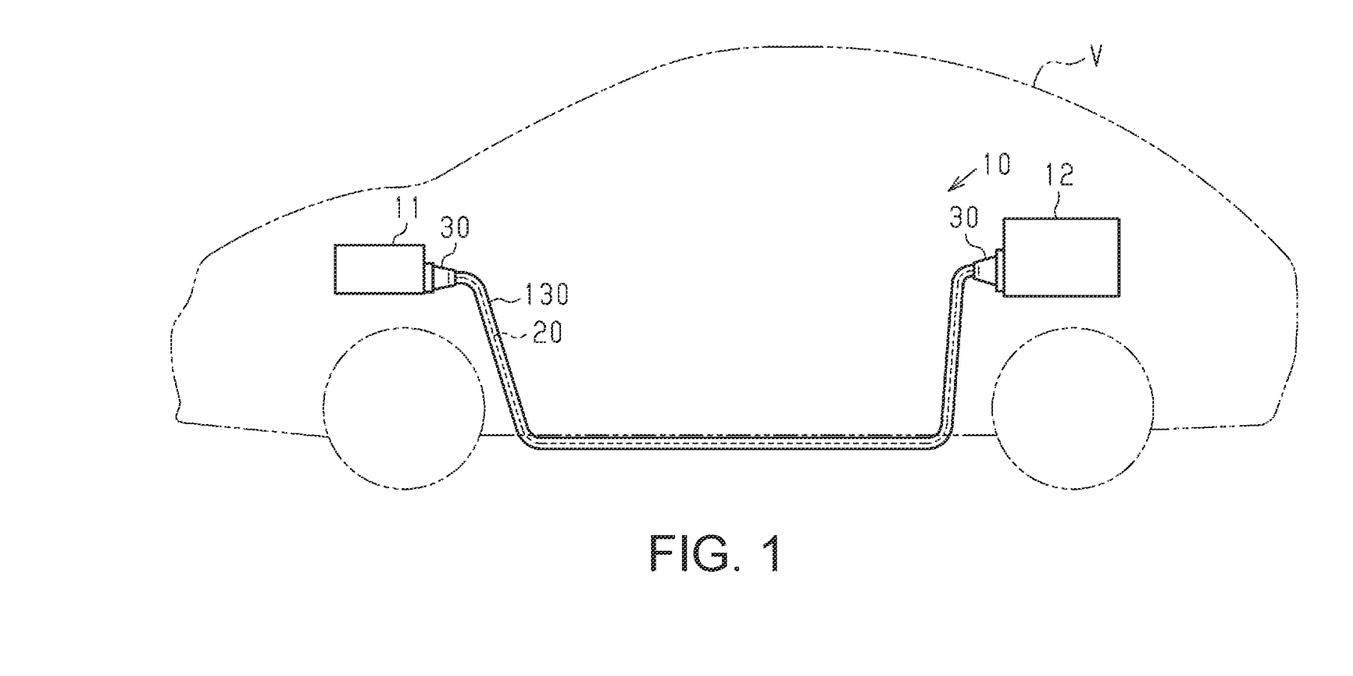
FIG. 1 is a diagram schematically illustrating a configuration of a wire harness according to an embodiment.

A wire harness 10 shown in FIG. 1 electrically connects two or three or more electrical devices (devices). For example, the wire harness 10 electrically connects an inverter 11 installed in a front portion of a vehicle V such as a hybrid car or an electric automobile to a high-voltage battery 12 installed in a rear portion of the vehicle V relative to this inverter 11. The wire harness 10 is laid so as to pass under the floor or the like of the vehicle V, for example. The inverter 11 is connected to a wheel driving motor (not shown), which serves as a motive power source for moving the vehicle. The inverter 11 generates alternating-current (AC) power using direct-current (DC) power of the high-voltage battery 12, and supplies the generated AC power to the motor. The high-voltage battery 12 is a battery capable of supplying a voltage of several hundred volts, for example.

The wire harness 10 includes a plurality of wires 20, a pair of connectors 30 attached to the two end portions of the wires 20, and a protective tube 130 that collectively surrounds the plurality of wires 20. Each of the wires 20 is formed, for example, in an elongated shape extending in the front-rear direction of the vehicle. Each of the wires 20 is a high-voltage wire capable of handling a high voltage and a large current, for example. Each of the wires 20 includes a conductive core wire and an insulating coating that covers the core wire. Each of the wires 20 may be a shielded wire with an electromagnetic shielding structure for shielding against electromagnetic waves, or may be a non-shielded wire without an electromagnetic shielding structure. One end portion of each wire 20 is connected to the inverter 11 via the connector 30, and the other end portion of each wire 20 is connected to the high-voltage battery 12 via the connector 30.

The protective tube 130 protects the wires 20 from flying objects and water droplets, for example. As the protective tube 130, it is possible to use, for example, a pipe made of a metal or a synthetic resin, a corrugated tube made of a metal or a synthetic resin, or a waterproof cover made of rubber, or a combination thereof.

Figure 2:
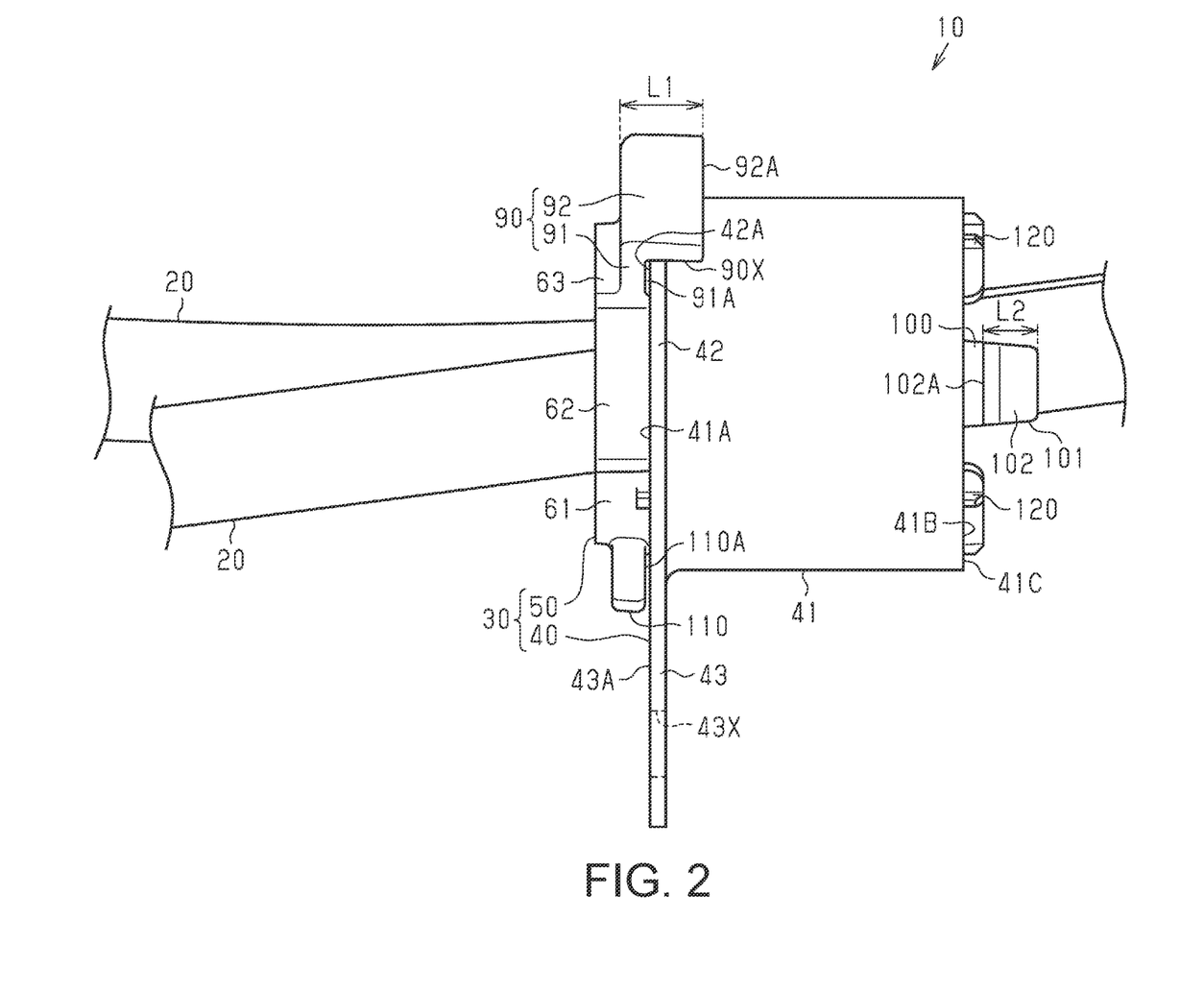
FIG. 2 is a side view illustrating the wire harness according to the embodiment.

As shown in FIG. 2, the connector 30 (wire harness 10) includes a bracket 40 made of a metal and a holder 50 that is made of a synthetic resin and is fitted to the bracket 40. As the material of the bracket 40, it is possible to use, for example, an iron-based or aluminium-based metal material. The bracket 40 may be subjected to surface treatment such as tin plating or aluminum plating depending on the type of component metal or usage environment thereof. As the material of the holder 50, it is possible to use, for example, a synthetic resin such as polyolefin, polyamide, polyester, and an ABS resin. Note that in FIG. 2, the illustration of the protective tube 130 is omitted.

Figure 3:
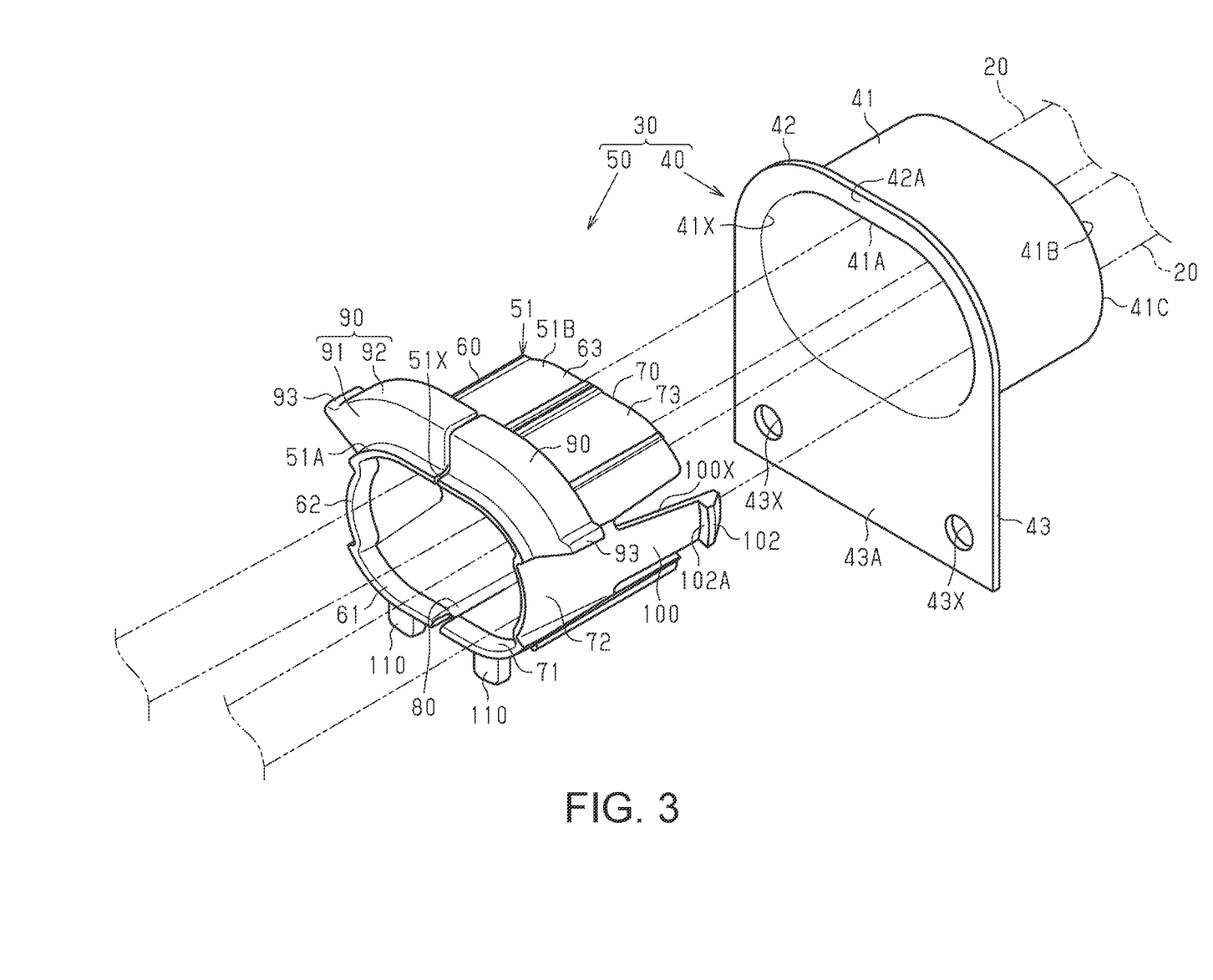
FIG. 3 is a perspective view schematically illustrating the wire harness according to the embodiment.

The following will describe a structure of the bracket 40 with reference to FIG. 3.

The bracket 40 includes a tubular portion 41 through which the plurality of wires 20 are inserted, a flange 42 formed at one opening end 41A of the tubular portion 41, and a fixing portion 43 formed further extending from a portion of the flange 42 radially outward of the tubular portion 41. The bracket 40 is a single member in which, for example, the tubular portion 41, the flange 42, and the fixing portion 43 are formed as one piece.

The tubular portion 41 has an insertion hole 41X through which the plurality of wires 20 are inserted. The tubular portion 41 of the present embodiment has the shape of an oval tube such that the transverse cross-sectional shape of the inner circumference thereof (that is, the cross-sectional shape of the tubular portion 41 taken along the plane orthogonal to the axial direction of the tubular portion 41) is an oval. That is to say, the insertion hole 41X of the tubular portion 41 of the present embodiment has the shape of an oval column whose transverse cross-sectional shape is an oval.

The tubular portion 41 has the opening end (end portion) 41A at which the flange 42 is formed, and an opening end (end portion) 41B opposite to the opening end 41A in the axial direction. Here, the opening end 41A is an opening end that is provided so as to face a case of an electrical device (such as the inverter 11 or the high-voltage battery 12 shown in FIG. 1) to which the connector 30 is to be attached. The opening end 41B is an opening end that is provided so as to face the protective tube 130 (see FIG. 1). The opening end 41B has an end face 41C.

The flange 42 is formed protruding radially outward from the opening end 41A of the tubular portion 41. The flange 42 is formed continuously over the entire circumference of the opening end 41A, for example.

The fixing portion 43 is formed extending radially outward from a portion of a leading end portion of the flange 42, for example. Accordingly, the fixing portion 43 is formed protruding radially outward relative to the flange 42. The fixing portion 43 is formed only in a portion of the tubular portion 41 in the circumferential direction. The fixing portion 43 of the present embodiment is formed extending downward from the lower half of the circumference of the leading end portion of the flange 42 when viewed in the drawings. The fixing portion 43 is substantially plate-shaped, for example. The fixing portion 43 is provided with bolt holes 43X for attaching the bracket 40 to the case of an electrical device (such as the inverter 11 or the high-voltage battery 12 shown in FIG. 1). The bolt holes 43X penetrate the fixing portion 43 in the plate thickness direction. Specifically, the bolt holes 43X penetrate the fixing portion 43 from an end face 43A that faces the case of the electrical device to the end face opposite to the end face 43A. The bracket 40 is attached to the case of the electrical device by bolts, for example.

Note that in the following, for convenience of description, the portion of the flange 42 in which the fixing portion 43 is not formed is simply referred to as "flange 42", and the portion of the flange 42 in which the fixing portion 43 is formed and the fixing portion 43 are collectively referred to as "fixing portion 43".

The following will describe a structure of the holder 50.

The holder 50 is formed so as to be capable of collectively surrounding the plurality of wires 20. The holder 50 is fitted to the tubular portion 41 of the bracket 40. The holder 50 is inserted into the insertion hole 41X of the tubular portion 41 and is attached to the tubular portion 41. As a result of being arranged inside the tubular portion 41 made of metal, the holder 50 has a function of protecting the wires 20 from the edges of the opening ends 41A and 41B of the tubular portion 41. As a result of covering the end edge of the bracket 40 (specifically, the end edge of the flange 42) from the outside in the radial direction, the holder 50 has a function of preventing, when an operator attaches the wire harness 10 to the vehicle V (see FIG. 1), a hand of the operator from coming into contact with the edge of the end edge of the bracket 40.

The holder 50 is inserted into the tubular portion 41, for example, in a direction (hereinafter, the direction is also referred to as "insertion direction") from the opening end 41A side (electrical device side) of the tubular portion 41 toward the opening end 41B side (protective tube 130 side).

Figure 4:
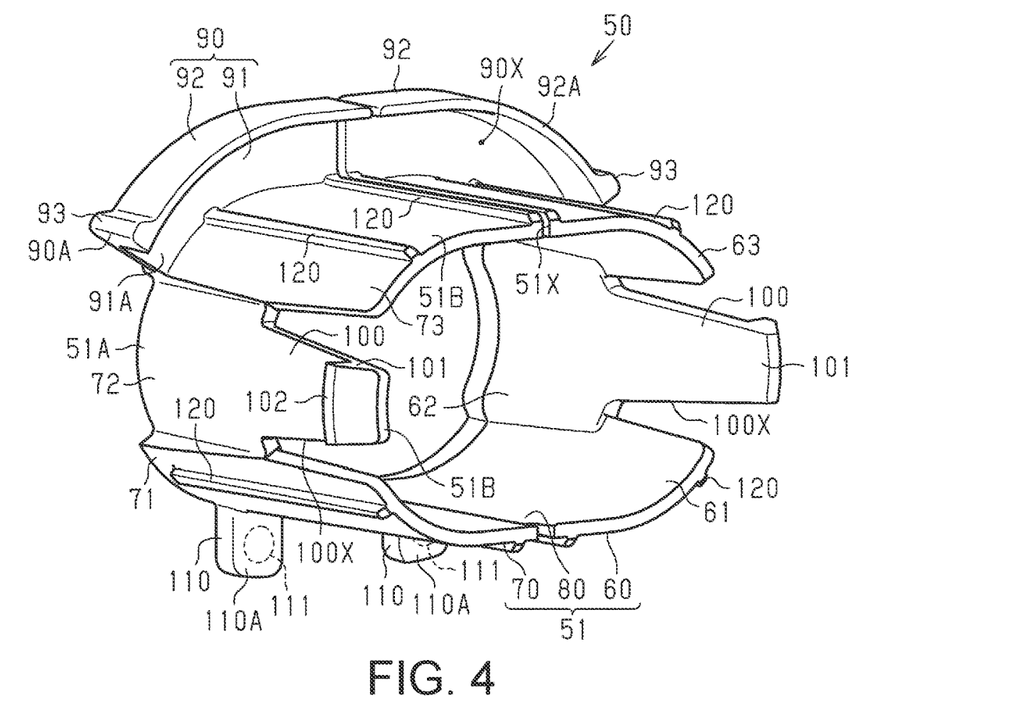
FIG. 4 is a perspective view schematically illustrating a holder according to an embodiment.

As shown in FIGS. 3 and 4, the holder 50 includes a tubular main body portion 51 (tubular main body), cover portions 90 (covers) formed on the outer circumferential surface of the main body portion 51, and projections 110 formed on the outer circumferential surface of the main body portion 51. The holder 50 is a single member in which the main body portion 51, the cover portions 90, and the projections 110, which are made of a synthetic resin material, are formed as one piece.

As shown in FIG. 3, the main body portion 51 is fitted to the inside the tubular portion 41 of the bracket 40. In other words, the main body portion 51 is inserted into the tubular portion 41. The main body portion 51 has an end portion 51A located on the front side (electrical device side) in the insertion direction with respect to the tubular portion 41, and an end portion 51B that is axially opposite to the end portion 51A and is located on the rear side (protective tube 130 side) in the insertion direction. The main body portion 51 has a shape that conforms to the inner circumferential surface of the tubular portion 41. The main body portion 51 of the present embodiment has the shape of an oval tube such that the transverse cross-sectional shape of the inner circumference thereof is oval. The outer diameter of the main body portion 51 is slightly smaller than the inner diameter of the tubular portion 41. The main body portion 51 has, at a position in the circumferential direction thereof, a split groove 51X that extends over the entire length of the main body portion 51 in the axial direction.

Figure 6A:
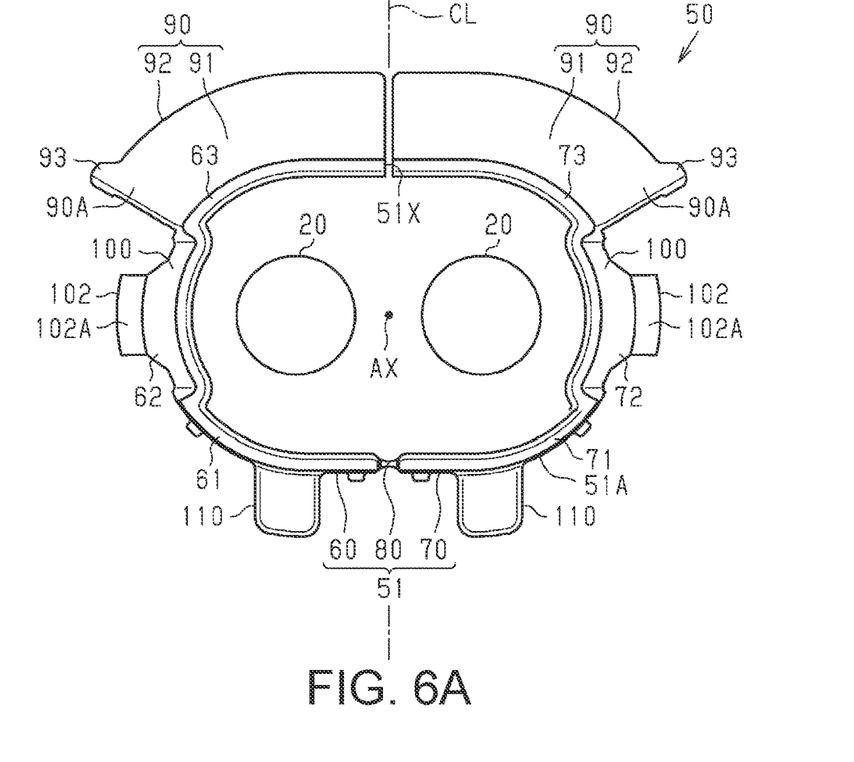
FIGS. 6(a) and 6(b) are front views illustrating the holder according to the embodiment.
Figure 6B:
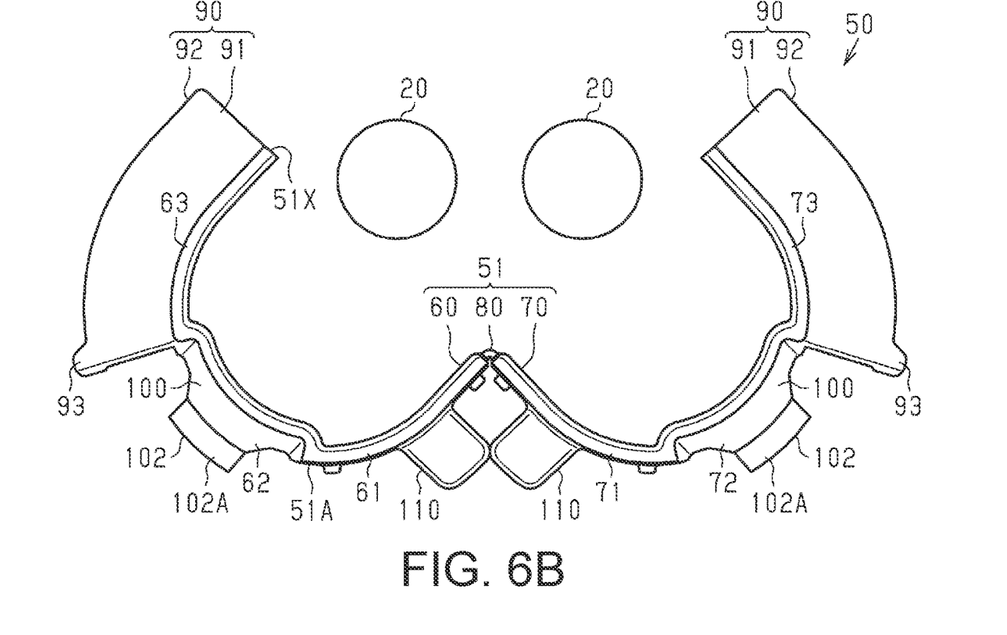

As shown in FIGS. 6(a) and 6(b), the main body portion 51 (holder 50) includes a pair of split bodies 60 and 70, and a hinge 80 that couples the end portion of the split body 60 on one side in the circumferential direction and the end portion of the split body 70 on one side in the circumferential direction. The hinge 80 is flexible. The hinge 80 is thinner than the split bodies 60 and 70, for example. The hinge 80 couples the pair of split bodies 60 and 70 so that they can be opened and closed. In other words, the main body portion 51 (holder 50) has a configuration in which the pair of split bodies 60 and 70 are openable and closable with the hinge 80 used as a pivot point. Specifically, the main body portion 51 (holder 50) is configured so as to be deformable between a closed position (see FIG. 6(a)) in which the pair of split bodies 60 and 70 are closed, and an open position (see FIG. 6(b)) in which the pair of split bodies 60 and 70 are open. Here, the width of the split groove 51X is larger when the main body portion 51 is in the open position shown in FIG. 6(b) than when the main body portion 51 is in the closed position shown in FIG. 6(a). Accordingly, by bringing the main body portion 51 into the open position, the plurality of wires 20 can be easily accommodated in the main body portion 51. Note that the main body portion 51 exhibits the shape of an oval tube overall in the closed position in which the pair of split bodies 60 and 70 are closed, as shown in FIG. 6(a).

The split body 60 includes a plurality of (three in the present embodiment) split pieces 61, 62, and 63. The split body 70 includes a plurality of (three in the present embodiment) split pieces 71, 72, and 73. The split body 60 (split pieces 61, 62, and 63) and the split body 70 (split pieces 71, 72, and 73) are line-symmetric (bilaterally symmetric in the drawings), for example. Specifically, in a front view of the holder 50 (FIG. 6(a)), the pair of split bodies 60 and 70 are line-symmetric with respect to a central line CL passing through an axial center AX of the main body portion 51 and the hinge 80 used as a symmetrical axis.

The end portions of the split pieces 61 and 71 on one side in the circumferential direction are coupled to the hinge 80, and the other end portions thereof in the circumferential direction are respectively coupled to the split pieces 62 and 72. The end portions of the split pieces 62 and 72 on one side in the circumferential direction are respectively coupled to the split pieces 61 and 71, and the other end portions thereof in the circumferential direction are respectively coupled to the split pieces 63 and 73. The above-described split groove 51X is formed between split piece 63 and the split piece 73. In the main body portion 51 of the present embodiment, the split groove 51X is formed on the side opposite to the hinge 80 with the axial center AX of the main body portion 51 interposed therebetween, that is, at a position shifted by about 180 degrees from the hinge 80 in the circumferential direction.

The split pieces 61, 62, and 63 of the present embodiment are formed at positions shifted from one another by about 60 degrees in the circumferential direction. Specifically, the split piece 62 is formed at a position shifted by about 60 degrees from the split piece 61 in the circumferential direction, and the split piece 63 is formed at a position shifted by about 60 degrees from the split piece 62 in the circumferential direction. Here, the split piece 61 and the split piece 63 are formed so as to oppose each other. Similarly, the split pieces 71, 72, and 73 of the present embodiment are formed at positions shifted from one another by about 60 degrees in the circumferential direction. The split piece 62 of the split body 60 and the split piece 72 of the split body 70 are formed so as to oppose each other.

As shown in FIG. 3, each of the split pieces 63 and 73 has, on the outer circumferential surface thereof, a cover portion 90 that protrudes radially outward from the outer circumferential surface. The cover portions 90 are formed on the outer circumferential surface of the split pieces 63 and 73 at the end portion 51A on the front side in the insertion direction. Note, however, that the cover portions 90 of the present embodiment are provided at positions spaced apart from the end face of the end portion 51A in the axial direction. Each cover portion 90 is formed, for example, over the entire length of the corresponding split piece 63 or 73 in the circumferential direction. The cover portion 90 formed on the split piece 63 and the cover portion 90 formed on the split piece 73 are aligned in the circumferential direction on substantially the same circumferential surface. The two cover portions 90 are formed so as to be separated from each other by the split groove 51X. In other words, the cover portions 90 of the present embodiment are obtained by dividing a cover into multiple parts (here, two parts) using the split groove 51X.

The cover portions 90 are formed only in a portion of the main body portion 51 in the circumferential direction. The cover portions 90 of the present embodiment are formed only on the outer circumferential surfaces of the split pieces 63 and 73 but not on the outer circumferential surfaces of the split pieces 61, 62, 71, and 72. The cover portions 90 are point-asymmetric with respect to the axial center AX of the main body portion 51, for example.

Each cover portion 90 includes a wall portion 91 formed protruding radially outward from the outer circumferential surface of the corresponding split piece 63 or 73, and a guard portion 92 (guard) that is formed at a radially outward end portion of the wall portion 91 and extends rearward in the insertion direction (toward the end portion 51B side). The wall portion 91 is formed extending radially outward from the outer circumferential surface of the corresponding split piece 63 or 73 so as to be substantially perpendicular thereto, for example. The guard portion 92 is formed extending substantially parallel to the outer circumferential surface of the corresponding split piece 63 or 73, for example.

As shown in FIG. 4, in each cover portion 90, an accommodation space 90X is formed by a space enclosed by the outer circumferential surface of the split piece 63 (split piece 73), the wall portion 91, and the guard portion 92. Specifically, the accommodation space 90X is a space enclosed by the outer circumferential surface of the split piece 63 (split piece 73), a protection face 91A, which is an end face of the wall portion 91 directed to the rear side in the insertion direction, and the inner circumferential surface of the guard portion 92. The accommodation space 90X is open to the rear side in the insertion direction and open to the outside in the circumferential direction. That is to say, the guard portion 92 is supported only by the wall portion 91, and no other member is provided between the guard portion 92 located to the rear of the wall portion 91 in the insertion direction and the split piece 63 or 73. In other words, the guard portion 92 is formed in a cantilever shape with the end portion connected to the wall portion 91 serving as a fixed end.

As shown in FIG. 2, the accommodation space 90X is formed so as to accommodate the opening end 41A of the tubular portion 41 including the flange 42 when the holder 50 is correctly fitted to the bracket 40 (in a fitted state). The accommodation space 90X is formed so as to accommodate a portion of the flange 42 in the circumferential direction. That is to say, the cover portions 90 are formed to cover the opening end 41A of the tubular portion 41 including the flange 42 in the fitted state. In the following description, a state in which the holder 50 is fitted to the bracket 40 so that the cover portions 90 cover the opening end 41A of the tubular portion 41 including the flange 42 is referred to as "the state in which the holder 50 is correctly fitted to the bracket 40" (also referred to simply as the "fitted state"). Also, in the fitted state, the direction in which the holder 50 is assembled is referred to as the "correct assembly direction".

The height of the wall portions 91 (that is, the amount of protrusion from the outer circumferential surfaces of the split pieces 63 and 73) is set so as to be slightly larger than the height of the flange 42 (that is, the amount of protrusion from the outer circumferential surface of the tubular portion 41). On the other hand, the height of the wall portions 91 is set so as to be slightly smaller than the height of the fixing portion 43 (that is, the amount of protrusion from the outer circumferential surface of the tubular portion 41). Accordingly, the fixing portion 43 cannot be accommodated in the accommodation space 90X. Also, in the fitted state, the end face 42A of the flange 42 comes into contact with the protection faces 91A of the wall portions 91. In the fitted state, the guard portions 92 are externally fitted to a portion of the tubular portion 41 in the circumferential direction and cover a portion of the outer circumferential surface of the tubular portion 41 from the outside in the radial direction.

As shown in FIG. 6(*a*), an end portion 90A of end portions of each of the cover portions 90 in the circumferential direction that is opposite to the split groove 51X (that is, the end portion on the side on which it is coupled to the corresponding split piece 62 or 72) is curved along an oval arc portion. The end portion 90A of the guard portion 92 in the circumferential direction has a protruding portion 93 (protrusion) that protrudes radially outward relative to the other portion of the corresponding guard portion 92, for example. As shown in FIG. 4, the protruding portion 93 is formed extending over the entire length of the guard portion 92 in the axial direction, for example.

Each of the split pieces 62 and 72 has a lock piece 100. Each lock piece 100 is configured to be able to deflect radially outward and inward. The lock piece 100 has, on both sides thereof, slits 100X extending in the axial direction. Each slit 100X is formed extending in the axial direction from the rear side of the corresponding split piece 62 or 72 in the insertion direction toward the end portion 51A, for example. Each slit 100X is formed extending from the opening end on the end portion 51B side to a mid-way position of the corresponding split piece 62 or 72 in the axial direction, for example. Each lock piece 100 is separated from the split pieces 61 and 63 (split pieces 71 and 73) by the slits 100X. Each lock piece 100 has a leading end portion 101 that protrudes further rearward in the insertion direction than the end faces of the split pieces 61 and 63 (split pieces 71 and 72) on the rear side in the insertion direction. Each lock piece 100 is formed in a cantilever shape with the leading end portion 101 serving as a free end, and the base end portion opposite to the leading end portion 101 in the axial direction serving as a fixed end. Each lock piece 100 is tapered such that its width decreases from the base end portion toward the leading end portion 101, for example. Note that, in the lock pieces 100, the leading end portions 101 of the lock pieces 100 constitute the end portion 51B of the main body portion 51 or the split pieces 62 and 72 (see FIG. 4).

The leading end portion 101 of each of the lock pieces 100 has an engagement claw 102 that protrudes radially outward, for example. As shown in FIG. 2, in the state in which the holder 50 is correctly fitted to the bracket 40, the engagement claws 102 are formed so as to engage with the end face 41C of the opening end 41B of the tubular portion 41. Specifically, each engagement claw 102 is formed so that an engagement face 102A thereof that faces the base end portion (that is, the front side in the insertion direction) of the lock piece 100 engages with the end face 41C of the tubular portion 41. As a result of the engagement faces 102A of the engagement claws 102 engaging with the end face 41C of the tubular portion 41, the holder 50 in the fitted state is kept from being removed from the bracket 40.

As shown in FIG. 4, the lock pieces 100 are respectively formed at positions shifted from the cover portions 90 in the circumferential direction. For example, each lock piece 100 is formed in a central portion, in the circumferential direction, of the circumference of the split body 60 (split body 70). The pair of lock pieces 100 are formed, for example, at positions shifted by about 90 degrees from the hinge 80 and the split groove 51X in the circumferential direction. The pair of lock pieces 100 are formed so as to oppose each other with the axial center AX of the main body portion 51 interposed therebetween, for example. The engagement claws 102 of the pair of lock pieces 100 are formed on substantially the same circumferential surface, for example.

Figure 5:
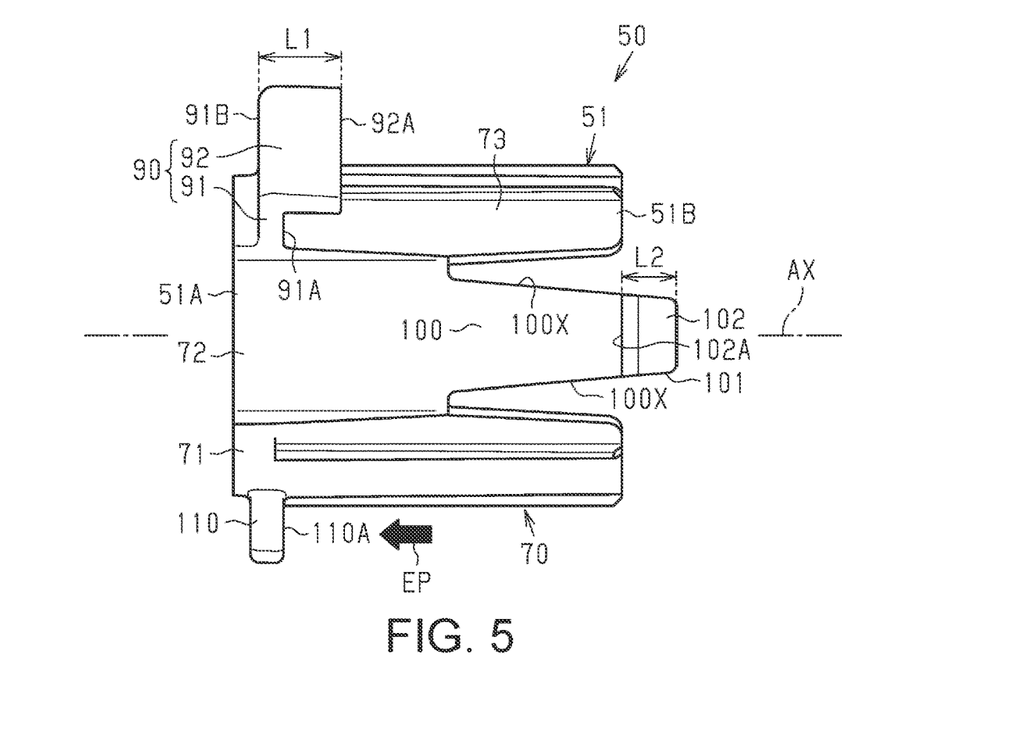
FIG. 5 is a side view illustrating the holder according to the embodiment.

Here, as shown in FIG. 5, an axial length L1 of the guard portion 92 of the cover portion 90 is set to be larger than an axial length L2 of the engagement claw 102. Specifically, the length L1 from the end face 91B of the wall portion 91 opposite to the protection face 91A to the end face 92A of the leading end portion of the guard portion 92 (the end portion thereof on the rear side in the insertion direction) is set to be larger than the length L2 from the leading end face of the leading end portion 101 of the lock piece 100 to the engagement face 102A of the engagement claw 102. This can prevent the holder 50 from being mistakenly assembled to the tubular portion 41 of the bracket 40 shown in FIG. 2 in a direction different from the correct assembly direction, for example, upside down with respect to the holder 50 shown in FIG. 2 (that is, in a state in which the cover portions 90 are opposed to the fixing portion 43). Specifically, if the holder 50 is fitted to the bracket 40 in a state in which the cover portions 90 are opposed to the fixing portion 43, due to the length L1 being set larger than the length L2, the end faces 92A of the guard portions 92 of the cover portions 90 will come into contact with the end face 43A of the fixing portion 43 before the engagement faces 102A of the engagement claws 102 engage with the end face 41C of the tubular portion 41. Accordingly, the holder 50 cannot be pressed in any further, and thus the engagement claws 102 cannot engage with the end face 41C of the tubular portion 41, and the holder 50 cannot be fitted to the bracket 40.

As shown in FIG. 4, each of the split pieces 61 and 71 has, on its outer circumferential surface, the projection 110 formed protruding radially outward from the corresponding outer circumferential surface. That is to say, the projections 110 are formed on the outer circumferential surfaces of the split pieces 61 and 71 coupled to the hinge 80. In FIG. 5, an arrow EP facing the projection 110 schematically shows an ejector pin for pressing and taking the holder 50 out of the mold at the time of manufacturing the holder 50. Each projection 110 has a press surface 110A to be pressed against by the ejector pin EP. That is to say, each projection 110 has the press surface 110A to be pressed against by the ejector pin EP for pressing and taking the holder 50 out of the mold at the time of manufacturing. The press surfaces 110A are formed so as to face the rear side in the insertion direction, for example. Each of the press surfaces 110A has a press track 111 formed by the ejector pin EP pressing against the press surface, for example.

The pair of projections 110 are formed to restrict the amount of opening when the pair of split bodies 60 and 70 are opened with the hinge 80 used as a pivot point. Specifically, the pair of projections 110 are formed so that when, as shown in FIG. 6(b), the pair of split bodies 60 and 70 are opened with the hinge 80 used as a pivot point, the projections 110 come into contact with each other before the outer circumferential surfaces of the split pieces 61 and 71 coupled to the hinge 80 come into contact with each other. The formation positions, heights, and the like of the projections 110 are set, for example, so that the amount of opening of the split bodies 60 and 70 can be restricted to a desired amount of opening. Note that the desired amount of opening is set according to the workability when accommodating the wires 20 in the holder 50 in the open position, the durability of the hinge 80, and the like.

Each projection 110 is formed extending radially outward from the outer circumferential surface of the split piece 61 (split piece 71) in a direction substantially perpendicular thereto, for example. For example, each projection 110 is formed on the outer circumferential surface of the end portion 51A of the split piece 61 (split piece 71) on the front side in the insertion direction. Note, however, that the projections 110 of the present embodiment are provided at positions spaced apart from the end face of the end portion 51A in the axial direction. Each projection 110 is formed only in a portion of the split piece 61 (split piece 71) in the circumferential direction, for example. Each projection 110 is formed on the outer circumferential surface of the central portion, in the circumferential direction, of the circumference of the split piece 61 (split piece 71), for example. The projection 110 formed on the split piece 61 and the projection 110 formed on the split piece 71 are, for example, line-symmetric (here, bilaterally symmetric) with respect to the hinge 80 used as a symmetrical axis. The projection 110 formed on the split piece 61 and the projection 110 formed on the split piece 71 are aligned in the circumferential direction on substantially the same circumferential surface.

The projections 110 are formed so as to be aligned with the wall portions 91 of the cover portions 90 in the circumferential direction on substantially the same circumferential surface, for example. Specifically, as shown in FIG. 2, the press surfaces 110A of the projections 110 and the protection faces 91A of the wall portions 91 are formed so as to be aligned in the circumferential direction on substantially the same circumferential surface. Accordingly, in the state in which the holder 50 is correctly fitted to the bracket 40, the end face 42A of the flange 42 abuts against the protection faces 91A of the wall portions 91 and the end face 43A of the fixing portion 43 abuts against the press surfaces 110A of the projections 110.

As shown in FIG. 6(a), the projections 110 are provided on the side opposite to the cover portions 90 in the vertical direction of the drawing with the axial center AX of the main body portion 51 interposed therebetween, for example. The projections 110 are formed, for example, in a different shape from that of the cover portions 90. Accordingly, the transverse cross-sectional shape of the holder 50 is up-down asymmetric. This can prevent the holder 50 from being mistakenly assembled to the tubular portion 41 shown in FIG. 2 in a direction different from the correct assembly direction, that is, upside down with respect to the holder 50 shown in FIG. 2, for example. Also, even if the holder 50 is assembled to the bracket 40 upside down with respect to the holder 50 shown in FIG. 2 while being inclined with respect to the tubular portion 41, the projections 110 will come into contact with the end face of the flange 42 or the end face of the fixing portion 43 when the holder 50 is being inserted. Accordingly, it is possible to prevent the holder 50 from being mistakenly assembled to the tubular portion 41 of the bracket 40 in a direction different from the correct assembly direction.

As shown in FIG. 4, the outer circumferential surfaces of the split pieces 61, 71, 63, and 73 each include, for example, one or more (two in the present embodiment) ribs 120 extending in the axial direction of the main body portion 51. The plurality of ribs 120 are formed spaced apart from each other at a predetermined distance in the circumferential direction of the main body portion 51. The ribs 120 are formed protruding radially outward from the outer circumferential surfaces of the split pieces 61, 71, 63, and 73. The ribs 120 are formed extending straight over substantially the entire length of the main body portion 51 in the axial direction. Specifically, the ribs 120 formed on the split pieces 63 and 73 extend straight in the axial direction from the end portion 51B of the split pieces 63 and 73 to the protection face 91A of the wall portion 91. Similarly, the ribs 120 formed on the split pieces 61 and 71 extend straight in the axial direction from the end portion 51B of the split pieces 61 and 71 to the positions in the axial direction at which the press surfaces 110A of the projections 110 are formed. Note that the outer circumferential surfaces of the split pieces 62 and 72 provided with the lock pieces 100 do not include a rib 120.

As described above, the holder 50 is point-asymmetric with respect to the axial center AX of the main body portion 51. The holder 50 of the present embodiment is bilaterally symmetric in the drawings, and is also up-down asymmetric in the drawings.

The following will describe functions and effects of the present embodiment.

(1) The holder 50 to be fitted to the bracket 40 includes the cover portions 90 each including the wall portion 91 that protrudes radially outward from the outer circumferential surface of the main body portion 51 of the holder 50, and the guard portion 92 that extends from a radially outward end portion of the wall portion 91 toward the end portion 51B of the main body portion 51 (that is, to the rear side in the insertion direction). The accommodation space 90X is formed by a space enclosed by the cover portions 90 (the wall portions 91 and the guard portions 92) and the outer circumferential surface of the main body portion 51. As a result of the accommodation space 90X accommodating an end portion (the flange 42 in the present embodiment) of the bracket 40, the end portion of the bracket 40 can be covered. Accordingly, even if the bracket 40 has a sharp end face on an end edge thereof, and the sharp end face faces radially outward and is exposed to the outside, the sharp end face can be covered by the cover portions 90. This can thus prevent, when, for example, an operator attaches the wire harness 10 to the vehicle V, a hand of the operator from coming into contact with the sharp end face of the bracket 40. Accordingly, it is possible to improve the attachment workability of the wire harness 10.

(2) Specifically, since the bracket 40 of the present embodiment includes the flange 42 that protrudes radially outward from the tubular portion 41, an operator's hand is likely to come into contact with the flange 42. As a countermeasure, in the present embodiment, the cover portions 90 are provided capable of covering the flange 42. As a result, it is possible to appropriately prevent an operator's hand from coming into contact with the sharp end face of the flange 42.

(3) The cover portions 90 constitute a portion of the main body portion 51 in the circumferential direction. That is to say, the outer circumferential surface of the end portion 51A of the main body portion 51 includes a portion in the circumferential direction in which no cover portion 90 is formed. By using such positions in the circumferential direction in which no cover portion 90 is formed and providing, at the positions, engagement portions such as the engagement claws 102 of the present embodiment, it is possible to mold the cover portions 90 and the engagement claws 102 as one piece. For example, if the cover portions 90 are formed over the entire circumference of the main body portion 51, it will be impossible to form the engagement portions such as the engagement claws 102, for molding reasons. Accordingly, in this case, there is a need to provide, in addition to the holder 50, a fixation structure for fixing the holder 50 to the bracket 40, which leads to the problems of the number of components increasing as well as complicating the fixing operation. In contrast, in the holder 50 of the present embodiment, even if the cover portions 90 are provided, it is possible to employ a structure in which the cover portions 90 and the engagement claws 102 can be molded as one piece. Accordingly, the holder 50 of the present embodiment can increase the degree of freedom in design. Note that, in the case where the cover portions 90 and the engagement claws 102 are molded as one piece, it is possible to suppress an increase in the number of components and improve the workability when the holder 50 is fixed to the bracket 40.

(4) The lock pieces 100 that are deflectable are provided at positions shifted from the cover portions 90 in the circumferential direction, and the lock pieces 100 each have an engagement claw 102 configured to engage with the tubular portion 41 of the bracket 40. Accordingly, even if an external force is applied to the cover portion 90, it is possible to prevent the external force from being transmitted to the lock piece 100. As a result, the engagement claw 102 of the lock piece 100 can be prevented from disengaging from the tubular portion 41 due to the influence of an external force applied to the cover portion 90.

(5) The length L1 of the guard portions 92 in the axial direction is set to be larger than the length L2 of the engagement claws 102 in the axial direction. Accordingly, it is possible to prevent the holder 50 from being mistakenly assembled to the tubular portion 41 of the bracket 40 in a direction different from the correct assembly direction, for example, upside down with respect to the holder 50 shown in FIG. 2. Specifically, if the holder 50 is fitted to the bracket 40 in a state in which the cover portions 90 are opposed to the fixing portion 43, due to the length L1 being set larger than the length L2, the end faces 92A of the guard portions 92 of the cover portions 90 will come into contact with the fixing portion 43 before the engagement faces 102A of the engagement claws 102 engage with the end face 41C of the tubular portion 41. Accordingly, the holder 50 cannot be pressed in any further, and thus the engagement claws 102 cannot engage with the end face 41C of the tubular portion 41, and the holder 50 cannot be fitted to the bracket 40. Accordingly, it is possible to prevent the holder 50 from being mistakenly assembled to the tubular portion 41 in a direction different from the correct assembly direction.

(6) The main body portion 51 has, on the outer circumferential surface thereof, the plurality of ribs 120 that extend in the axial direction of the main body portion 51. In this case, in the fitted state in which the holder 50 is fitted to the bracket 40, the ribs 120, instead of the outer circumferential surface of the main body portion 51, are in contact with the inner circumferential surface of the tubular portion 41. Accordingly, the inner circumferential surface of the tubular portion 41 of the bracket 40 can be in point contact or line contact with the main body portion 51 (ribs 120). As a result, it is possible to improve the workability when inserting the main body portion 51 into the tubular portion 41, compared to a case where the inner circumferential surface of the tubular portion 41 is in surface contact with the outer circumferential surface of the main body portion 51.

(7) The projections 110 are formed at positions on the outer circumferential surface of the main body portion 51 opposite to the cover portions 90 with an axial center AX of the main body portion 51 interposed therebetween, the projections 110 protruding radially outward from the outer circumferential surface, and the projections 110 having a shape different from that of the cover portions 90. Accordingly, the holder 50 can have a point-asymmetric shape with respect to the axial center AX of the main body portion 51. Specifically, the holder 50 can be up-down asymmetric in FIG. 6(a). Therefore, it is possible to prevent the holder 50 from being attached to the bracket 40 in a wrong direction.

(8) The projections 110 are formed on the same circumferential surface as that of the wall portions 91 of the cover portions 90. According to this configuration, in a state in which the holder 50 is correctly fitted to the bracket 40, the end face 42A of the flange 42 abuts against the protection faces 91A of the wall portions 91 and the end face 43A of the fixing portion 43 abuts against the press surfaces 110A of the projections 110. Accordingly, with the projections 110 and the wall portions 91, it is possible to restrict the amount of insertion of the holder 50 into the tubular portion 41. Also, even if the holder 50 is assembled to the bracket 40 upside down with respect to the holder 50 shown in FIG. 2 while being inclined with respect to the tubular portion 41, the projections 110 will come into contact with the end face 42A of the flange 42 or the end face 43A of the fixing portion 43 when the holder 50 is being inserted. Accordingly, it is possible to prevent the holder 50 from being mistakenly assembled to the bracket 40 in a direction different from the correct assembly direction.

(9) The main body portion 51 includes the split groove 51X that is formed in a portion thereof in the circumferential direction and extends over the entire length of the main body portion 51 in the axial direction, and the main body portion 51 is constituted by the pair of split bodies 60 and 70, and the hinge 80 that couples the pair of split bodies 60 and 70 so that they can be opened and closed. With this configuration, by bringing the pair of split bodies 60 and 70 into the open position (see FIG. 6(b)), it is possible to easily accommodate the plurality of wires 20 inside the holder 50.

(10) Each of the guard portions 92 includes, at the end portion thereof in the circumferential direction, the protruding portion 93 that protrudes radially outward relative to the other portion of the guard portion 92. With this configuration, by pushing on the protruding portions 93 with fingers when an operator opens the pair of split bodies 60 and 70, it is possible to easily open the pair of split bodies 60 and 70. Accordingly, it is possible to improve the workability when accommodating the plurality of wires 20 in the holder 50.

(11) The projections 110 are configured to restrict the amount of opening of the pair of split bodies 60 and 70. Accordingly, it is possible to suppress damage to the hinge 80 caused when the pair of split bodies 60 and 70 are opened too widely with the hinge 80 used as a pivot point.

(12) The projections 110, which are formed to ensure the press surfaces 110A for the ejector pins EP essential for molding, are used as a restricting member for restricting the amount of opening of the pair of split bodies 60 and 70. Accordingly, it is possible to reduce the number of components and simplify the structure of the holder 50, as compared to a case where a member for ensuring the press surfaces for the ejector pins EP and a member for restricting the amount of opening are separately provided.

OTHER EMBODIMENTS

The above-described embodiment can be modified and implemented in the following manner. The above-described embodiment and the following modifications can be combined and implemented so long as no technical inconsistency arises.

The ribs 120 of the holder 50 of the above-described embodiment may be omitted.

In the above-described embodiment, the leading end portions 101 of the lock pieces 100 (that is, the end portions 51B of the split pieces 62 and 72) are formed protruding to the rear side in the insertion direction relative to the end portions 51B of the other portions of the main body portion 51 (that is, the split pieces 61, 63, 71, and 73), but the present disclosure is not limited to this. For example, the leading end portions 101 of the lock pieces 100 may be formed on the same circumferential surface as that of the end portions 51B of the other portions of the main body portion 51, or may be formed at positions recessed to the front side in the insertion direction relative to the end portions 51B of the other portions of the main body portion 51.

The structure of the engagement portion of the holder 50 of the above-described embodiment with respect to the bracket 40 may be modified. For example, in the above-described embodiment, the engagement claws 102 for engaging with the end face 41C of the opening end 41B of the tubular portion 41 are provided on the holder 50. The present disclosure is not limited to this, and a configuration is also possible in which, for example, an engagement hole is provided in an intermediate portion of the tubular portion 41 in the axial direction, and an engagement claw for engaging with the engagement hole is provided on the holder 50. Also, a configuration is also possible in which, for example, an engagement claw that protrudes radially inward is provided at an intermediate portion of the tubular portion 41 in the axial direction, and an engagement hole that engages with the engagement claw is provided on the holder 50. In this case, the position of the engagement claw or the engagement hole provided on the holder 50 is not limited to the leading end portion 101 of the lock piece 100, and the engagement claw or the engagement hole may be provided at the intermediate portion of the lock piece 100 in the axial direction.

The lock pieces 100 and the engagement claws 102 of the holder 50 of the above-described embodiment may be omitted. In this case, for example, the holder 50 is fixed to the bracket 40 by winding a piece of tape therearound.

The hinge 80 of the holder 50 of the above-described embodiment may be omitted. In this case, the split body 60 and the split body 70 are directly coupled to each other, for example.

The split groove 51X of the holder 50 of the above-described embodiment may be omitted.

In the above-described embodiment, the holder 50 is point-asymmetric with respect to the axial center AX of the main body portion 51, but the present disclosure is not limited to this. For example, the holder 50 may be point-symmetric with respect to the axial center AX of the main body portion 51.

In the above-described embodiment, the split body 60 and the split body 70 are line-symmetric, but the present disclosure is not limited to this. For example, the split body 60 and the split body 70 may be line-asymmetric.

In the above-described embodiment, the split body 60 is constituted by three split pieces 61, 62, and 63, but the number of split pieces that constitute the split body 60 is not particularly limited. Similarly, the number of split pieces that constitute the split body 70 is not particularly limited. For example, the split bodies 60 and 70 may each be constituted by one split piece or two split pieces, or may be constituted by four or more split pieces.

The projections 110 of the holder 50 of the above-described embodiment may be omitted.

In the holder 50 of the above-described embodiment, instead of the projections 110, cover portions 90 may be formed. That is to say, the split pieces 61 and 71 may include, on the outer circumferential surfaces thereof, cover portions 90 similar to the cover portions 90 formed on the outer circumferential surfaces of the respective split pieces 63 and 73.

In the above-described embodiment, the cover portions 90 are formed over the entire length of the split pieces 63 and 73 in the circumferential direction, but the present disclosure is not limited to this. For example, the cover portions 90 may be formed only in portions of the respective split pieces 63 and 73 in the circumferential direction.

In the above-described embodiment, the protruding portion 93 is formed only in one end portion 90A of the end portions of each guard portion 92 in the circumferential direction (that is, the end portion on the side coupled to the split piece 62 or 72), but the present disclosure is not limited to this. For example, such protruding portions 93 may be formed on both end portions of each guard portion 92 in the circumferential direction.

The protruding portions 93 of the guard portions 92 of the above-described embodiment may be omitted.

In the above-described embodiment, the length L1 of the guard portions 92 in the axial direction is set to be larger than the length L2 of the engagement claws 102 in the axial direction, but the present disclosure is not limited to this. For example, the length L1 of the guard portions 92 in the axial direction may be set to be equal to the length L2 of the engagement claws 102 in the axial direction, or may be set to be smaller than the length L2.

In the above-described embodiment, the bracket 40 is embodied as a tubular member (tube), but the present disclosure is not limited to this. For example, a modified bracket may be used in which the flange 42 is omitted and only the fixing portion 43 is provided at the opening end 41A of the tubular portion 41. Also, a modified bracket may be used that includes only the tubular portion 41 with the flange 42 and the fixing portion 43 omitted.

In the above-described embodiment, the holder 50 is configured to be attached to the bracket 40 to be fixed to the electrical device, but the present disclosure is not limited to this. For example, the holder 50 may be configured to be attached to an end portion of a metal pipe used as the protective tube 130.

In the above-described embodiment, the tubular portion 41 of the bracket 40 and the main body portion 51 of the holder 50 have the shape of an oval tube, but the present disclosure is not limited to this. For example, the tubular portion 41 and the main body portion 51 may have the shape of a circular tube, an elliptic tube, or a rectangular tube.

In the above-described embodiment, two wires 20 are inserted into the bracket 40 and the holder 50, but the present disclosure is not particularly limited to this. The number of wires 20 may be changed according to the specification of the vehicle. For example, the number of wires 20 that are inserted into the bracket 40 and the holder 50 may be one, or three or more.

The layout relationship between the inverter 11 and the high-voltage battery 12 of the vehicle is not limited to that of the above-described embodiment, and may be suitably modified according to the configuration of the vehicle.

In the above-described embodiment, the inverter 11 and the high-voltage battery 12 are employed as electrical devices connected by the wires 20, but the present disclosure is not limited to this. For example, the present disclosure may be employed for wires that connect the inverter 11 and a wheel driving motor. That is to say, the present disclosure is applicable to any wire that electrically connects electrical devices to be installed in a vehicle.

The hinge 80 of the holder 50 may have a restorative force for biasing the split bodies 60 and 70 toward the closed position (FIG. 6(a)). The split groove 51X of the holder 50 may be formed by mating faces or abutting faces of the two split bodies 60 and 70 between them.

The main body portion 51 of the holder 50 may also be referred to as a tubular casing. The split bodies 60 and 70 may also be referred to as split casings.

The assembly of the bracket 40 and the holder 50 may also be referred to as a wire protector assembly that protects the outer circumferential surfaces of the wires 20 or the insulating coatings of the wires 20 against damage.

According to a specific embodiment, the bracket 40 includes a tubular portion 41 that has the first opening end 41A and the second opening end 41B. The tubular portion 41 of the bracket 40 is as long as the distance from the first opening end 41A to the second opening end 41B. The tubular portion 41 forms a wire insertion passage that allows one or more wires 20 to be passed therethrough. The flange 42 of the bracket 40 is an example of a plate-shaped protruding portion that protrudes radially outward from the first opening end 41A of the tubular portion 41 and has a first protrusion height. This plate-shaped protruding portion (flange 42) can have a radially outward end face or radially outward end edge. The bracket 40 can have a plate-shaped fixing portion 43 provided with the bolt holes 43X used to attach the bracket 40 to the case of an electrical device. The plate-shaped fixing portion 43 protrudes radially outward from the first opening end 41A of the tubular portion 41 at a position different from the position at which the plate-shaped protruding portion (flange 42) is formed, and has a second protrusion height larger than the first protrusion height of the plate-shaped protruding portion (flange 42).

According to a specific embodiment, the holder 50 is configured to be fitted to the bracket 40 and hold at least part of the bracket 40. The holder 50 is configured to prevent or reduce the likelihood of one or more wires 20 coming into direct contact with the first opening end 41A and the second opening end 41B of the tubular portion 41 of the bracket 40. The holder 50 includes the guard portions 92 that cover at least a portion of the radially outward end face or the radially outward end edge of the plate-shaped protruding portion (flange 42) of the bracket 40 from the outside in the radial direction. The guard portions 92 may also be referred to as safety guards that prevent or reduce the likelihood of at least portion of the radially outward end face or the radially outward end edge of the plate-shaped protruding portion (flange 42) of the bracket 40 being directly touched by a human hand. The cover portions 90 of the guard portions 92 may also be referred to as safety covers.

According to a specific embodiment, the holder 50 includes the tubular casing 51. The tubular casing 51 includes the hinge 80 formed at a first circumferential position on the outer circumferential surface of the tubular casing 51. The tubular casing 51 is constituted by the two split casings 60 and 70 that are coupled to each other by the hinge 80 so as to be rotatable. The tubular casing 51 includes the split groove 51X at a position (second circumferential position) different from the position at which the hinge 80 is formed. The split groove 51X can be formed by mating faces or abutting faces of the split casings 60 and 70 between them. The split groove 51X may extend, for example, straight in the axial direction of the tubular casing 51. The width of the split groove 51X increases when the two split casings 60 and 70 are rotated about the hinge 80 and are opened, and the width of the split groove 51X decreases when the two split casings 60 and 70 are rotated about the hinge 80 and are closed. The tubular casing 51 includes two projections 110 that protrude radially outward at two positions (third and fourth circumferential positions) on the outer circumferential surface of the tubular casing 51 that are different from the positions at which the hinge 80 and the split groove 51X are respectively formed. The outer circumferential surface of the tubular casing 51 (split casings 60 and 70), excluding the outer circumferential surfaces of the projections 110, is a surface without protrusions. When the two split casings 60 and 70 are rotated about the hinge 80 and are opened, the two projections 110 abut against each other before such surfaces without protrusions of the two split casings 60 and 70 abut against each other, so that the maximum opening angle of the two split casings 60 and 70 is restricted. When the split casings 60 and 70 are opened to the maximum opening angle, the split groove 51X has a maximum groove width that is larger than the sum of diameters of one or more wires 20. When the two split casings 60 and 70 are rotated about the hinge 80 and are closed (at the minimum opening angle), the split groove 51X has a minimum groove width that is smaller than the sum of diameters of one or more wires 20. By finely adjusting the positions (the third and fourth circumferential positions) of the two projections 110 and/or the protrusion height of the two projections 110 during the design process of the holder 50, it is possible to easily change the maximum opening angle of both the split casings 60 and 70 and the maximum groove width of the split groove 51X.

The projections 110 may be, for example, plate-shaped projections. The plate thickness of the projections 110 may be larger than the wall thickness of the outer circumferential wall of the tubular casing 51. The projections 110 require mechanical strength sufficient for restricting the maximum opening angle of the split casings 60 and 70, but the mechanical strength required by the tubular casing 51 to be inserted into the tubular portion 41 of the bracket 40 is relatively small. Accordingly, in order to ensure the mechanical strength of and downsize the holder 50, it is advantageous to increase the plate thickness of the projections 110 and reduce the wall thickness of the outer circumferential wall of the tubular casing 51.

The present disclosure includes the following implementation examples. The reference numerals of the representative constituent components of the representative embodiments are given as an aid to facilitate understanding rather than restricting the disclosure.

[Supplementary Note 1]

According to a non-restrictive embodiment, a wire protector assembly (40, 50) includes:

a bracket (40) that is made of metal and includes a tubular portion (41), wherein the tubular portion (41) includes a first opening end (41A) and a second opening end (41B), and the tubular portion (41) forms a wire insertion passage that allows one or more wires (20) to be passed therethrough; and a holder (50) that is made of a synthetic resin and is configured to be assembled later to the bracket (40) to hold at least a portion of the bracket (40), wherein the bracket (40) includes a plate-shaped protruding portion (42) that extends radially outward from the first opening end (41A) of the tubular portion (41), and the plate-shaped protruding portion (42) has a radially outward end face and a radially outward end edge, and the holder (50) includes a safety guard (92) configured to prevent or reduce the likelihood of at least portions of the radially outward end face and the radially outward end edge of the plate-shaped protruding portion (42) of the bracket (40) being directly touched by a human hand.

[Supplementary Note 2]

The safety guard (92) has a size such that it can cover at least portions of the radially outward end face and the radially outward end edge of the plate-shaped protruding portion (42) of the bracket (40) from the outside in the radial direction.

[Supplementary Note 3]

The holder (50) is configured to prevent or reduce the likelihood of the one or more wires (20) coming into direct contact with the first opening end (41A) and the second opening end (41B) of the tubular portion (41) of the bracket (40).

[Supplementary Note 4]

The holder (50) includes a tubular main body portion (51) that is inserted into the tubular portion (41) from the first opening end (41A) of the tubular portion (41) of the bracket (40), and the safety guard (92) is provided only in a first circumferential portion of the outer circumferential surface of the tubular main body portion (51).

[Supplementary Note 5]

The holder (50) includes a hinge (80) configured to bring the tubular main body portion (51) into an open position at which the tubular main body portion (51) is to be assembled later to the one or more wires (20).

[Supplementary Note 6]

In a front view (FIG. 6(*a*)) of the holder (50), the safety guard (92) and the hinge (80) are provided at angular positions different from each other with respect to an axial center (AX) of the tubular main body portion (51).

[Supplementary Note 7]

The tubular portion (41) of the bracket (40) has a first tube length from the first opening end (41A) to the second opening end (41B), and the tubular main body portion (51) of the holder (50) has a second tube length that is larger than the first tube length of the tubular portion (41).

[Supplementary Note 8]

The holder (50) includes a base end portion that comes in contact with the first opening end (41A) of the tubular portion (41) of the bracket (40) and protrudes in the axial direction from the first opening end (41A), and a leading end portion that comes in contact with the second opening end (41B) of the tubular portion (41) and protrudes in the axial direction from the second opening end (41B).

It will be apparent for a person skilled in the art that the present disclosure may be embodied in any other unique modes without departing from the technical idea thereof. For example, some of the components described in the embodiment (or one or more modes thereof) may be omitted, or may be combined. The scope of the present disclosure should be defined by referencing the attached claims, together with the entire scope of the equivalents of the claims that a patent is to be granted.

The invention claimed is:

1. A holder configured to be fitted to a tube that is made of metal and through which a wire is to be inserted, the holder comprising:

a tubular main body that includes a first end and a second end opposite to the first end, and is configured to be inserted into the tube; and a cover formed protruding radially outward from an outer circumferential surface of the main body at the first end, wherein:

the cover is formed only in a portion of the main body in a circumferential direction of the main body, the cover includes a wall that protrudes radially outward from the outer circumferential surface of the main body, a guard that extends from a radially outward end of the wall toward the second end of the main body, and a protruding portion protruding radially outward relative to an other portion of the guard and extending over an entire length of the guard in an axial direction of the main body, two projections are formed on the outer circumferential surface of the main body, the two projections including a projection and an other projection, the two projections abutting each other when the holder is in an open position, the projection is formed at a position on the outer circumferential surface of the main body opposite to the cover with an axial center of the main body interposed therebetween, the projection protruding radially outward from the outer circumferential surface, and the projection has a shape different from that of the cover.

2. The holder according to claim 1, wherein:

the main body includes a lock piece that is deflectable and is provided at a position shifted from the cover in the circumferential direction of the main body, and the lock piece has an engagement configured to engage with the tube.

3. The holder according to claim 2, wherein:

the engagement is an engagement claw that is provided at the second end of the lock piece and protrudes radially outward, and a length of the guard in the axial direction of the main body is set to be larger than a length of the engagement claw in the axial direction of the main body.

4. The holder according to claim 1, wherein the main body has, on the outer circumferential surface thereof, a plurality of ribs that extend in the axial direction of the main body.

5. The holder according to claim 1, wherein the projection is formed on the same outer circumferential surface of the main body as that of the wall of the cover.

6. The holder according to claim 1, wherein:

the main body includes a split groove that is formed in a portion of the main body in the circumferential direction and extends over an entire length of the main body in the axial direction of the main body, and the main body includes a pair of split bodies, and a hinge that couples the pair of split bodies so that the split bodies can be opened and closed.

7. The holder according to claim 6, wherein the guard includes, at an end thereof in the circumferential direction of the main body, a protrusion that protrudes radially outward relative to an other portion of the guard.

8. A wire harness comprising:

the holder according to claim 1;

the tube to which the holder is fitted; and the wire inserted into the tube.

9. The wire harness according to claim 8, wherein the tube includes: a tubular portion into which the holder is inserted; and a fixing portion that is provided at one opening end of the tubular portion and protrudes from a portion of the one opening end in the circumferential direction of the main body radially outward of the tubular portion.

10. The wire harness according to claim 8, wherein the tube includes: a tubular portion into which the holder is inserted; a flange that is provided over the entire circumference of one opening end of the tubular portion, and protrudes from the one opening end radially outward of the tubular portion; and a fixing portion formed protruding radially outward from a portion of the flange in the circumferential direction of the main body, and the cover is formed so as to accommodate a portion of the flange where the fixing portion is not formed.

\* \* \* \* \*